June 21, 1932.  E. K. LE FEVRE  1,864,137
AIRCRAFT OF THE AUTO ROTOR TYPE
Filed July 28, 1931   5 Sheets-Sheet 1
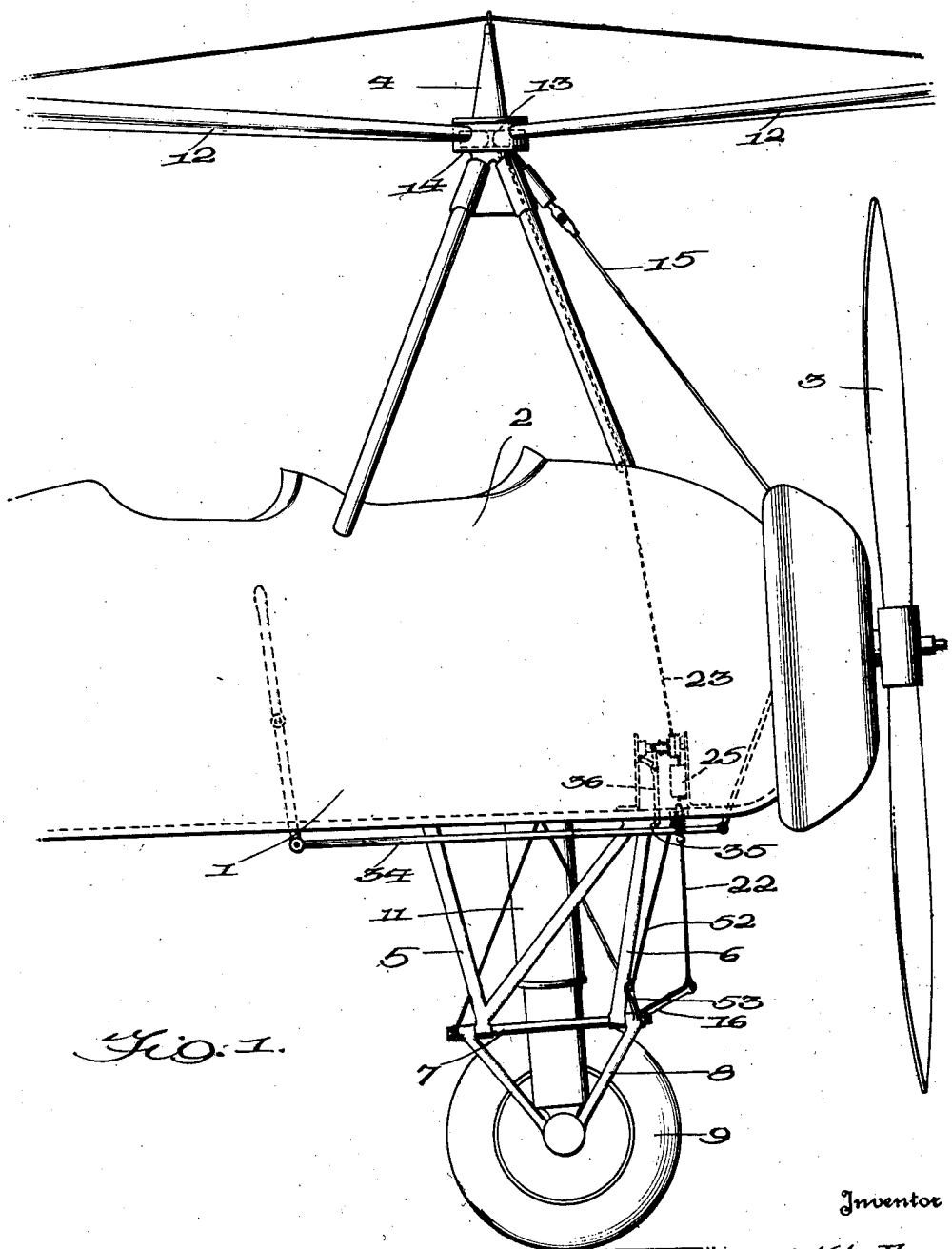

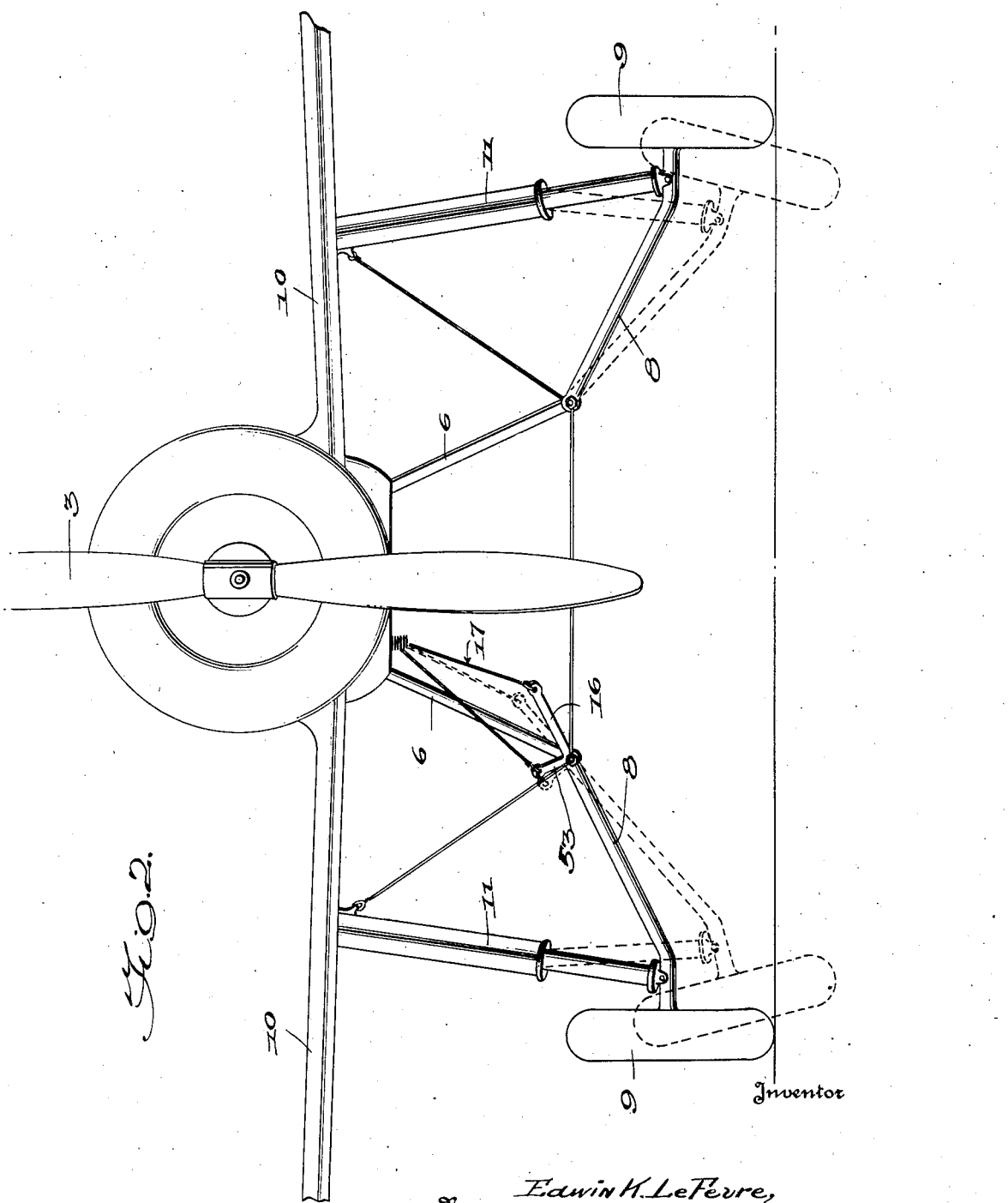

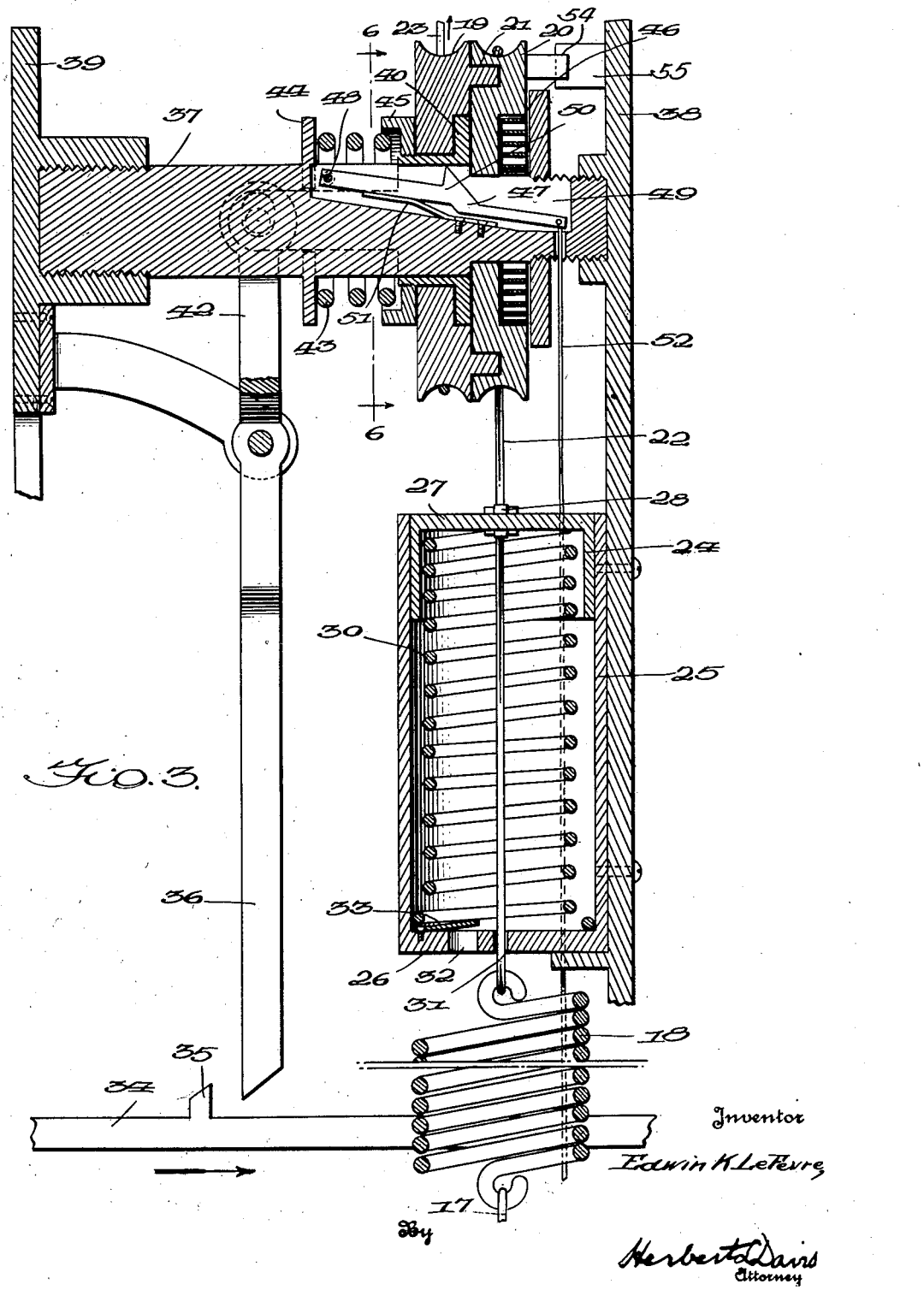

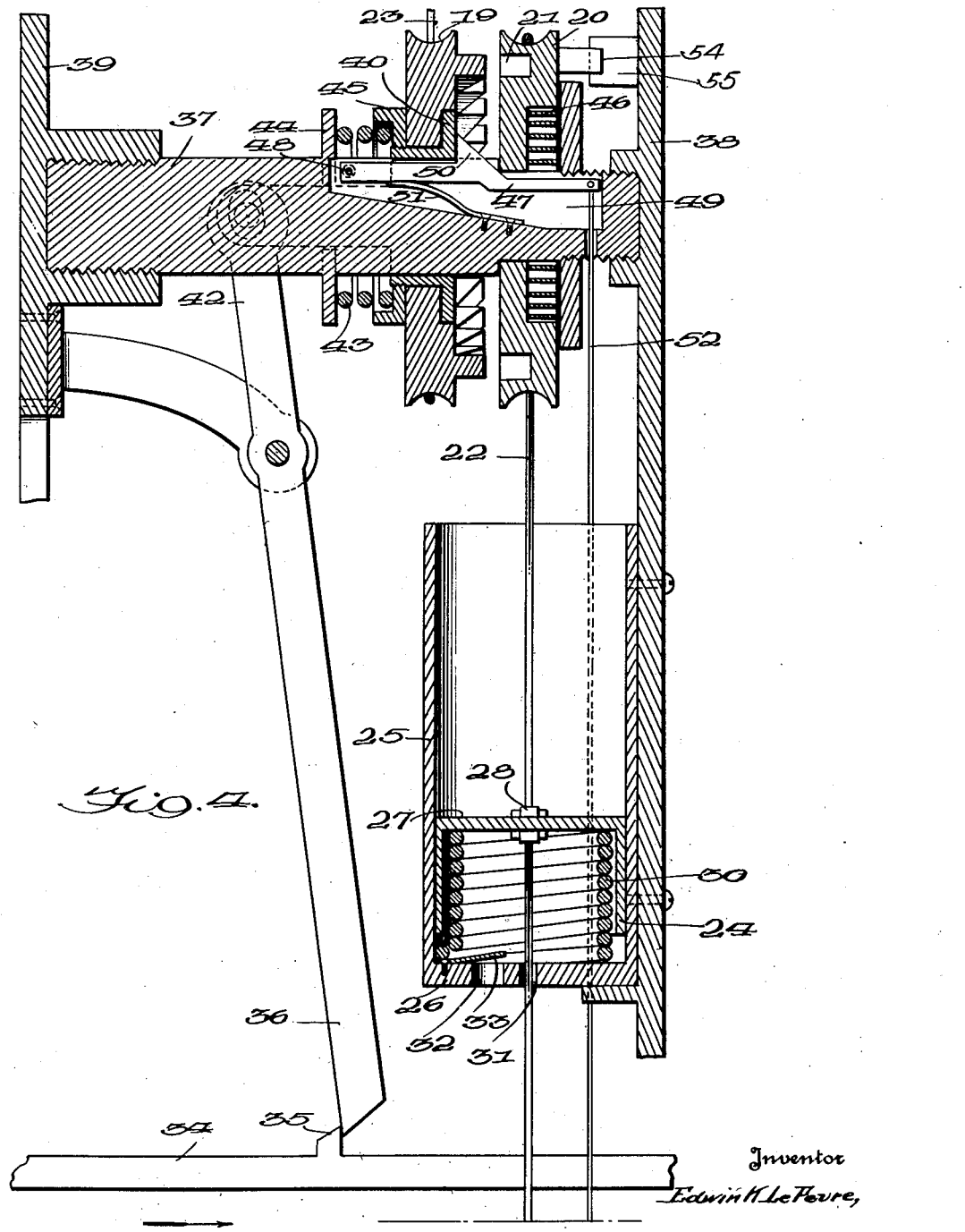

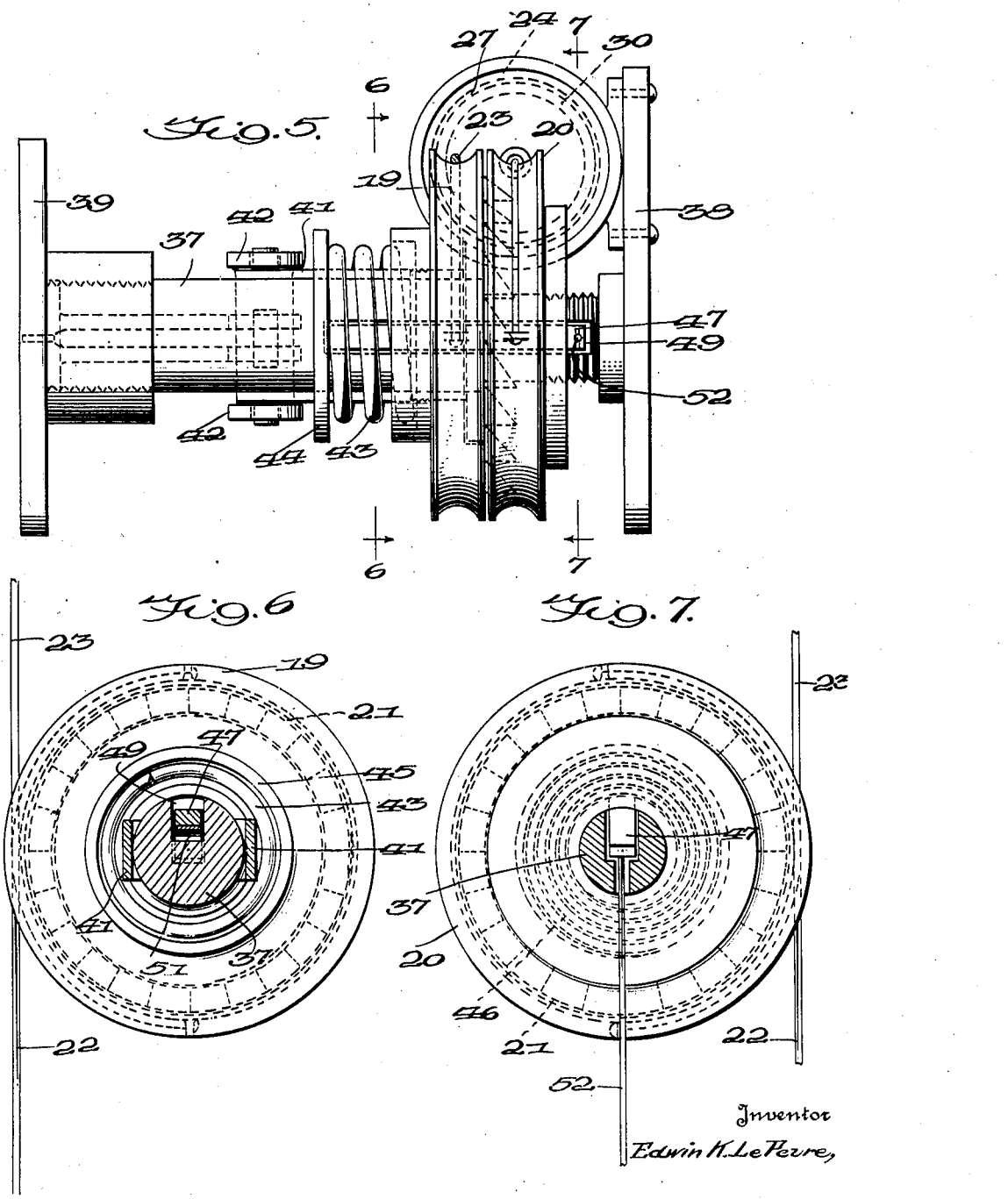

Patented June 21, 1932

1,864,137

UNITED STATES PATENT OFFICE

EDWIN K. LE FEVRE, OF WASHINGTON, DISTRICT OF COLUMBIA, ASSIGNOR TO WHITFIELD ENGINEERING COMPANY, OF WASHINGTON, DISTRICT OF COLUMBIA, A CORPORATION OF DELAWARE

AIRCRAFT OF THE AUTO-ROTOR TYPE

Application filed July 28, 1931. Serial No. 553,655.

This invention relates to improvements in the control of air craft of the auto-rotor type, and it has for its general object the provision of means for automatically braking the rotor of the auto-rotor at the moment of landing and for automatically releasing the brake as the starting clutch for the rotor is thrown in prior to taking off.

Another object of the invention is to provide a brake control for the rotor actuated through contact of some instrumentality of the air craft with the earth. In the case of air craft with yielding landing gear, this would be brought about by relative displacement of rigid and yielding elements due to the weight of the craft and the inertia in landing. In air craft with rigid landing gear such as sea planes, the desired control would be accomplished by a device specially provided, yielding upon contact with the water when the auto-rotor lands.

Another object of the invention is to provide a brake control mechanism in which provision is made for transforming the variable forces engendered by the oscillations of the yielding landing gear as the air craft taxis to a landing over uneven ground into a steady application of the braking power, as well as absorbing the peak inertia yield of the landing gear at the moment of landing, and applying the brake with predetermined optimum celerity and uniformity.

Still another object of the invention is to provide means for positively holding the brake control mechanism in brake release position from the time it is automatically released when the starting clutch is thrown in, to the time the air craft leaves the ground, whereupon the parts are automatically restored to a position in which the brake control mechanism is ready to repeat the braking action when the air craft again comes to earth.

Other objects of the invention will appear as the following description of a preferred and practical embodiment thereof proceeds.

In the drawings, in the several figures of which the same characters of reference have been used to designate identical parts, Figure 1 is a side elevation of an auto-rotor incorporating the features of the present invention;

Figure 2 is a front elevation of the same, the ground wheels being shown in full in the position assumed when the air craft is on the ground;

Figure 3 is a vertical section through the mechanism constituting the present invention, the parts being shown in the flying or brake release position;

Figure 4 is a similar view showing the parts in the position assumed just as the brake is released and the motor clutch being thrown in;

Figure 5 is a plan view of the mechanism when the parts are in the position shown in Figure 3;

Figure 6 is a section taken along the line 6—6 of Figure 5 viewed in the direction of the arrows; and Figure 7 is a cross section taken along the line 7—7 of Figure 5.

Referring now in detail to the several figures, the numeral 1 represents an air craft of the auto-rotor type having the fuselage 2, propellor 3, rotor 4 and landing gear 5, all of known construction. Figure 2 shows that the landing gear comprises fixed struts 6 carrying the side bars 7, the latter forming trunnions upon which are mounted the swinging struts 8 which carry the ground wheels 9.

The auto-rotor, as is usual in air craft of this type, has short wings 10, upon the under sides of which at an intermediate point, are mounted the shock absorbers 11 connected at their opposite ends with the swinging struts 8.

Due to the approximately vertical nature of the landings usually made by air craft of this type, the shock absorbers are designed with an exceptionally long range of movement as is indicated by the value of the angle between the ground and flying positions of the swinging struts 8 indicated respectively, in full and broken lines in Fig. 2.

The rotor 4 comprises the usual blades 12 fixed to a hub 13 having a brake 14 and being connectible by means of a shaft 15 and a clutch not shown, but which is common in auto-rotors with the motor, by means of which the rotor is given its initial rotary movement. It is highly desirable that the rotation of the rotor should be suppressed immediately the auto-rotor touches the ground in landing, and it is already common to have a brake on the rotor hub controlled at the will of the operator. As has been pointed out in the declaration of the objects of the invention, it is now proposed to substitute or supplement the manual brake control by an automatic control.

In carrying out the principles of the invention, the swinging struts 8 are each provided with an extension 16 or its equivalent on the opposite side of the fulcrum represented by the side bar 7. Said extension is connected by means of a cable 17 or its equivalent with the brake shoe through the intermediary of mechanism now to be described so that when the shock absorbers 11 are telescoped by the weight and inertia of the air craft on landing, the extension 16 will be shifted from the dotted line position shown in Figure 2 to the full line position exerting a pull upon the cable 17 and setting the brake.

It will be observed from Figures 3 and 4 that the mechanism intercalated in the brake operating cable comprises a heavy spring 18 and a pair of pulleys 19 and 20 normally clutched together as suggested by the annular toothed faces 21 shown in Figure 3, the cable being divided in the region of the pulleys, one part 22 being fixed to the pulley 20 while the other part 23 leads to the brake shoe. The spring 18 of course, responds instantaneously to the deflections of the strut 8, which deflections are greatest of course at the moment of landing, at which moment the weight of the air craft is augmented by the inertia of its descent. Thereafter, as the air craft taxis along the ground, the spring 18 responds to the variable oscillations of the strut 8. In order to smooth out the inequalities in the pull of the spring 18 on the cable due to these variable deflections of the strut 8, a dash pot 24 is provided comprising in the present illustrative embodiment, a casing 25 having a fixed bottom 26 and a plunger 27 through which the cable passes and to which it is affixed by means such as the nuts 28 and 29. A spring 30 of lighter tension than the spring 18 is within the casing 25 and normally holds the plunger 27 in its outermost position maintaining the dash pot expanded This is the condition prevailing when the auto-rotor is in flight.

An orifice 31 is provided in the bottom of the casing, through which for convenience, the cable portion 22 passes, said orifice being so calibrated as to permit the gradual collapse of the dash pot at a rate predetermined to produce the optimum braking action, regardless of the intensity of the pull of the spring 18. In order to permit the dash pot to quickly return to its normal expanded position, an inlet port 32 may be provided controlled by a check valve 33 so placed as to block the discharge of the air of said dash pot through said port.

It is obvious from the above description that whilesoever the air craft is on the ground the shock absorbers will be in sufficiently telescoped condition to maintain a pull upon the brake cable, keeping the dash pot plunger drawn down. This pull has been transmitted through the clutched pulleys 19 and 20 and to the brake shoe.

It is highly important however that when the rotor is put in gear with the motor preparatory to taking off, the brake be released, and this is accomplished by automatically declutching the pulleys 19 and 30, simultaneous with the operation of the lever which clutches the motor and rotor. The lever is represented at 34 in Figure 3, which lever is shown provided with a lug 35 movable in the path of a lever 36 by means of which last named lever the pulleys are declutched. The lug 35 is so positioned that it causes the declutching of said pulleys just prior to the instant when the starter clutch is thrown into operation.

Referring to Figures 3 and 4, it will be observed that the pulleys 19 and 20 are journalled on a rod 37 fixed to suitable supports 38 and 39 in the fuselage. The pulley 19 is mounted on a sleeve 40 movable longitudinally of said rod and having side extensions 41 engaged at their ends by a yoke 42 formed at the end of the lever 36. A spring 43 is confined between the fixed abutment 44 and a cup 45 carried by the sleeve 40. The spring is under compression and normally holds the pulleys in clutched position. When the lever 36 is swung by the movement of the lever 34 in the direction of the arrow shown in Figure 3, the spring 43 is compressed by the leftward movement of the sleeve 40, declutching the pulley 19 by withdrawing the teeth of the annular faces 21 apart.

It will be understood that when this declutching takes place, a spring, not shown, but which is an inherent part of the brake shoe mechanism, expands pulling the cable portion 23 upward in the direction of the arrow shown at the top of Figure 3, causing partial rotation of the pulley 19 and at the same time releasing the brake.

Since this release movement takes place while the air craft is on the ground there will be no change in the position of the dash pot which will remain collapsed, the spring 18 and that part of the cable which attaches said spring to the landing gear remaining under tension. In order to prevent any tendency of the pulley 20 to unwind when it is declutched from the pulley 19, causing the cable portion 22 to become slack; a retriever spring 46 is provided, preferably housed within said pulley which maintains it in winding relation to the cable portion 22, keeping it taut.

Latching means are provided for holding the pulleys in declutched position, that is to say, holding the brake released until the air craft again leaves the ground. This is to ensure that when the rotor has been brought up to flying speed by the starter nothing can possibly intervene to reduce the flying speed. The latching means comprises a lever 47 fulcrumed at 48 and housed in a slot 49 formed in the bar 37. Said lever is provided with a projection 50 forming a shoulder and when the brake is in applied position said lever together with the projection 50 lies entirely within the slot 49, the projection 50 bearing against one of the over-lying elements such for instance as the sleeve 40. The lever 47 is normally urged outwardly by a leaf spring 51 fixed at the bottom of the slot 49. The end of the lever 47 opposite the fulcrum 48 is attached to a cable 52 leading to an arm 53, see Figure 2, fixed with respect to the strut 8 and partaking of the oscillations thereof.

When the pulley 19 is declutched, the projection 50 springs up ahead of the sleeve 40 preventing return of the pulley 19 to engaging position with respect to the pulley 20 until means has operated for pulling the lever 47 back to releasing position. Such means is constituted by the arm 53 which just as soon as the air craft leaves the ground and the strut 8 swings back to the broken line position, pulling on the cable 52 withdrawing the projection 50 out of engagement with the sleeve 40 permitting the latter to spring back to a position in which the pulleys 19 and 20 are again united.

When the pulleys 19 and 20 were declutched, the retriever 46 maintained the pulley 20 in such position as to hold taut that portion of the cable 22 extending between the dash pot and pulley, the dash pot being maintained held down by the tension of the spring 18 produced by the contracted state of the landing gear incident to the air craft still being on the ground.

When the air craft leaves the ground the extension 16 is rocked upwardly slacking the cable 17 and permitting the dash pot to expand under the urge of the spring 30. This relieves the tension on the cable portion 22 permitting the retriever to wind said cable portion upon the pulley 20 until the lug 54 on said pulley engages the fixed limit stop 55.

While I have in the above specification disclosed what I believe to be a preferred and practical form of the invention, it is to be understood that the details of construction as described and illustrated are merely by way of example, that variations in the construction and arrangement of the several parts may be made without transcending the scope of the invention and that the invention contemplates the application of the broad principles hereinbefore enunciated and exemplified, not only to air craft of the land type but to amphibian and sea planes as well.

What I claim is:

1. Brake control for the rotors of auto-rotor air craft comprising a brake operator and means operable responsive to a function of the air craft in landing for actuating said operator to apply the brake.

2. Brake control for the rotors of auto-rotor air craft comprising a cable connected to the brake, and means at the opposite end of said cable operable responsive to the landing of said air craft for tensioning said cable to apply the brake.

3. Brake control for the rotors of auto-rotor air craft comprising a cable connected to the brake, yielding landing gear, said cable being connected to a yielding element of said landing gear for tensioning said cable upon the landing of said air craft to apply said brake.

4. Brake control for the rotors of auto-rotor air craft comprising a cable connected to the brake, yielding landing gear including an oscillatable strut, said cable being attached to said strut and being tensioned when said strut oscillates under the weight and inertia of the air craft in landing, for applying said brake.

5. Brake control for the rotors of auto-rotor air craft comprising a cable connected to the brake, yielding landing gear including an oscillatable strut fulcrumed at an intermediate point, an elongatable shock absorber engaging one end of said strut, said cable being attached adjacent the other end of said strut and being tensioned when said strut yields with the shock absorber under the weight and inertia of said air craft upon landing, for applying the brake.

6. Brake control for the rotors of auto-rotor air craft comprising a cable connected to the brake, means at the opposite end of said cable operable responsive to the landing of said air craft for tensioning said cable to apply the brake, and a resilient stretchable element intercalated in the line of said cable.

7. Brake control for the rotors of auto-rotor air craft comprising a cable connected to the brake, yielding landing gear, to a yielding element of which the opposite end of said cable is attached, said cable being operable responsive to the landing of said air craft to apply the brake, and a resilient stretchable member intercalated in the line of said cable allowing for a greater amplitude of yield in the said yielding element of said landing gear than is required for the application of said brake.

8. Brake control for the rotors of auto-rotor air craft as claimed in claim 7, including a dash pot intercalated in the line of said cable for determining the rate of celerity of the brake application regardless of the suddenness and non-uniformity of the tensioning of said cable by the yielding element of said landing gear.

9. Brake control for the rotors of auto-rotor air craft comprising a cable connected to the brake, and means at the opposite end of said cable operable responsive to the landing of said air craft for tensioning said cable to apply said brake, and a clutch intercalated in the line of said cable for releasing said brake independently of the tensioned condition of said cable maintained by the position of said tensioning means while the air craft remains grounded.

10. Brake control for the rotors of auto-rotor air craft of the type having yielding landing gear comprising a cable connected to the brake and to a yielding element of said landing gear, said cable being operable responsive to the landing of said air craft for tensioning said cable to apply the brake, and a clutch intercalated in the line of said cable and adapted to be declutched for releasing said brake independently of the tensioned condition of said cable maintained by the position of said landing gear while the air craft is grounded.

11. Brake control for the rotors of auto-rotor air craft as claimed in claim 10, including a lever for connecting the rotor of said auto-rotor to a starter, and means on said lever for actuating said cable clutch for declutching said clutch and releasing said brake.

12. Brake control for the rotors of auto-rotor air craft as claimed in claim 10, including means for simultaneously connecting the rotor of said auto-rotor to a starter and declutching said cable clutch to release said brake.

13. Brake control for the rotors of auto-rotor air craft as claimed in claim 10, including a latch for holding the cable clutch in declutched position, and means operable by the landing gear when the air craft takes flight for releasing said latch.

14. Brake control for the rotors of auto-rotor air craft of the type having yielding landing gear, comprising a cable connected to the brake and to a yielding element of said landing gear, said cable being operable responsive to the landing of said air craft for tensioning said cable to apply the brake, a clutch intercalated in the line of said cable adapted to be declutched for releasing said brake independently of the tension condition of that part of said cable by the said clutch and said landing gear, maintained by the position of said landing gear while the air craft is grounded, a declutching lever, a starting lever for connecting the rotor of said autogyro to a starter, said starting lever engaging said declutching lever when moved to starting position for declutching said cable clutch, a latch for holding said cable clutch in declutched position and means operable by said landing gear at the moment said air craft takes flight for releasing said latch.

15. Brake control for the rotors of auto-rotor air craft comprising a cable connected to the brake, yielding landing gear, to a yielding element of which the opposite end of said cable is attached, said cable being operable responsive to the landing of said air craft to apply the brake, a spring intercalated in the line of said cable allowing for greater amplitude of yield in the said yielding element of said landing gear than is required for the application of said brake, a clutch in the line of said cable between said spring and said brake, said cable being divided, one part being secured to each member of the clutch, a dash pot interposed in the line of said cable between said clutch and said spring for determining the rate of celerity of the brake application regardless of the suddenness or non-uniformity of the tensioning of said cable by the yielding element of said landing gear, a lever for connecting said rotor to a motor, a declutching lever, said starting lever being engageable with said declutching lever for declutching the clutch for releasing said brake when said rotor is started.

16. Brake control for the rotors of auto-rotor air craft as claimed in claim 15, the cable clutch being in the form of pulleys to which the parts of said cable are attached, and a retriever spring associated with that pulley to which the cable leading to the landing gear is attached for maintaining taut that portion of the cable between said dash pot and pulley, when the clutch is in brake release position, while the portion of cable between said dash pot and landing gear is still tensioned due to the air craft being still grounded.

17. Brake control for the rotors of auto-rotor air craft as claimed in claim 15, the cable clutch being in the form of pulleys to which the parts of said cable are attached, and a retriever spring associated with that pulley to which the cable leading to the landing gear is attached for maintaining taut that portion of the cable between said dash pot and pulley, when the clutch is in brake release position, while the portion of cable between said dash pot and landing gear is still tensioned due to the air craft being still grounded, a latch for automatically holding said pulleys in declutched position for maintaining said brake released while the landing gear is in grounded position, and means operable at the moment said air craft takes flight for releasing said latch to permit said pulleys to re-assume clutched position.

18. Means adapted to respond to the impulse of an actuating device, thereby operating an actuated device comprising clutched pulleys, cable portions connected to said pulleys and operating unitarily to transmit the actuating impulse when said pulleys are clutched, means for declutching said pulleys, a latch for holding said pulleys declutched, and means for actuating said latch to release the same upon reversal in the direction of the actuating impulse.

19. Means adapted to respond to the impulse of an actuating device, and thereby operating an actuated device comprising clutched pulleys, cable portions connected to said pulleys and respectively to said actuating and said actuated devices, said cable portions operating unitarily to transmit the actuating impulse when said pulleys are clutched, means for declutching said pulleys, a latch for holding said pulleys declutched, means for actuating the latch to release the same upon reversal in the direction of the actuating impulse, a dash pot in that cable portion connected to said actuating means for determining the rate and intensity and extent of transmission of the actuating impulse to the actuated device, and a retriever for holding taut that portion of the cable between said dash pot and the pulley to which said cable portion is fixed, when said pulleys are declutched.

In testimony whereof I affix my signature.

EDWIN K. LE FEVRE.